April 9, 1935.　　　J. D. COCHRANE, JR　　　1,997,358

SYNTHETIC RESIN PRODUCT AND PROCESS

Filed July 20, 1933

Inventor:
John D. Cochrane, Jr.
By Dyrenforth, Lee, Chritton & Wiles
Attys.

Patented Apr. 9, 1935

1,997,358

UNITED STATES PATENT OFFICE 1,997,358

SYNTHETIC RESIN PRODUCT AND PROCESS

John D. Cochrane, Jr., Cincinnati, Ohio, assignor to The Formica Insulation Company, Cincinnati, Ohio, a corporation of Ohio Application July 20, 1933, Serial No. 681,385

10 Claims. (Cl. 154—2)

This invention relates to synthetic resin products and process.

The primary object is to provide an improved process, whereby an improved product having or yielding a surface finish of superior quality may be produced.

The invention is particularly useful in connection with urea-formaldehyde condensation products, and more especially in the production of laminated products of satisfactory character.

An important object is to provide against "crazing" in the surface finish of laminated products making use of a condensation product of the urea-formaldehyde type.

In the practice of the improved process, it is preferred to employ a urea-formaldehyde resin varnish containing finely ground transparent paper, or other suitable fibre, for the purpose of producing a "non-crazing", tough, continuous-surface film. Urea-formaldehyde resin is inherently hard and brittle in the reacted form. Many attempts have been made to produce a tougher material by the addition of plasticizers, but so far as I am aware, no material has been found which does not affect either cure, water resistance, or the light resistance of the urea-formaldehyde resin.

The invention is illustrated, in a preferred embodiment and in certain modifications, in the accompanying drawing, in which—

Figure 1:
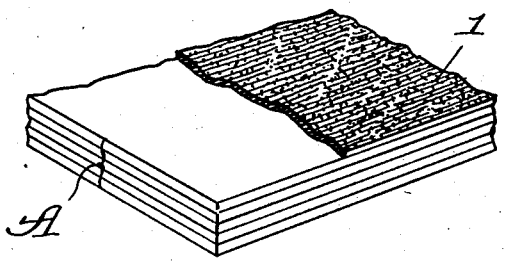
Figure 2:
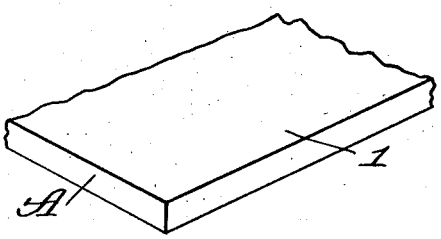
Figure 3:
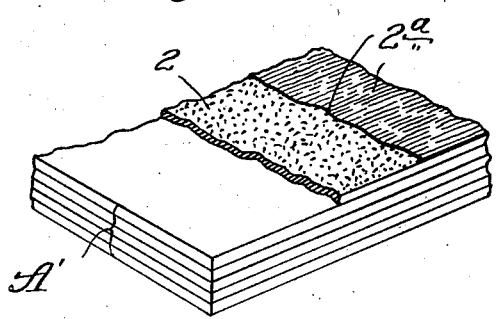
Figure 4:
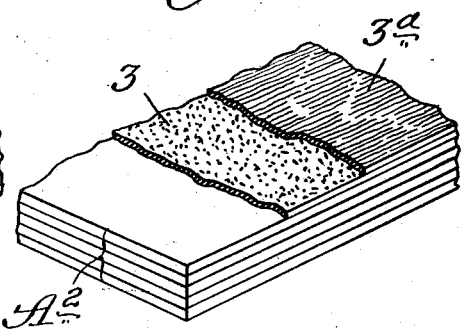
Figure 5:
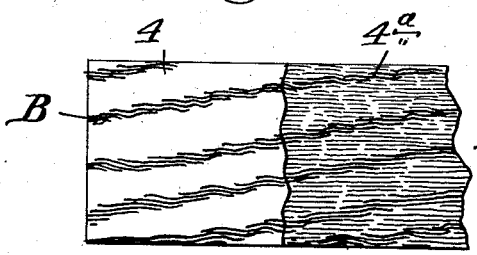

Fig. 1 is a broken perspective view illustrating the preferred practice in forming laminated products, preferably employing urea-formaldehyde resin varnish as a binder, said varnish having incorporated therein particularly as applied to the surface sheet, a pigment and a minor percentage of finely ground paper fibre, the surface sheet of the assembly being shown brokenly; Fig. 2, a broken perspective view of the assembly shown in Fig. 1, after the same has been consolidated under heat and pressure; Fig. 3, a broken perspective view illustrating a modification in which the surface sheet is treated with varnish containing pigment (to give opacity and desired color), and this surface sheet then has applied to it a film of varnish containing finely ground paper; Fig. 4, a broken perspective view illustrating a further modification, showing an assembly of body-sheets, a barrier-sheet impregnated with varnish containing a pigment, and a surface-sheet impregnated with clear urea-formaldehyde varnish containing finely ground paper fibres; Fig. 5, a broken plan view illustrating an adaptation of the process to the production of a decorative surface-sheet, this surface-sheet, after being printed, having applied thereto varnish containing finely ground paper; and Fig. 6, a broken plan view illustrating the use of a decorative surface-sheet impregnated with varnish containing pigment, and afterwards coated with clear varnish containing a small percentage of finely ground paper.

Referring to Figs. 1 and 2, A designates an assembly of body-sheets impregnated with a synthetic resin varnish, preferably a phenol-formaldehyde or a urea-formaldehyde condensation product varnish; and I designates a surface-sheet superimposed upon the body sheets, the surface-sheet preferably being coated or impregnated with a urea-formaldehyde varnish containing a pigment adapted to give opacity and containing a small percentage of finely ground paper fibre adapted to prevent "crazing" of the surface film after the assembly has been consolidated under heat and pressure.

The urea-formaldehyde resin may be prepared and held in solution by any suitable known process. Preferably, a varnish is employed which contains about 50% solids and a suitable solvent, or combination of solvents.

The body-sheets may be impregnated, dried, cut and stacked according to any well-known method.

The surface-sheet I preferably is coated or impregnated with a composition varnish containing a pigment and ground fibres. The pigment may be of any desired color, or a small percentage of a dye may be added to give desired color. The following is a suitable varnish composition to yield a white enameled surface, but a large variety of colors and gradations of colors may be produced. To produce a white surface, the following varnish-composition may be employed:

| | Percent |
|---|---|
| Urea-formaldehyde resin varnish (50% solids) | 80 |
| Titanium oxide white pigment | 15 |
| Finely ground paper fibre | 5 |

The ingredients are thoroughly mixed, and the varnish-composition is then applied to the surface-sheet I in any desired manner, as by dipping, spraying, brushing, or the like. After drying, the surface-sheet is placed upon the previously prepared stack of body-sheets. The assembly is then pressed in a heated press for a suitable period to convert the resin to the final infusible and substantially insoluble state. Pressures comparable to those ordinarily employed in producing laminated phenolic condensation products may be used. The temperature preferably should be considerably above 100° C. A suitable temperature is 135° C. and a suitable pressure is 1,100 lbs. per square inch.

Fig. 2 represents the product after it has been consolidated under heat and pressure and the resin has been transformed to the infusible, substantially insoluble condition. The treatment described produces a laminated structure of great strength and solidity, having a nicely enameled surface, which is of tough, tenacious character and free from "crazing", or cracking. That is, the surface film is a smooth, continuous film, entirely free from tendency to develop minute cracks, or "crazing" lines.

Any suitable material may be employed in producing the body-sheets. The same is true with respect to the surface sheet, paper being preferred ordinarily, especially for the surface-sheet.

While the body to which the surface-sheet is applied preferably is a laminated structure, any suitable body-composition may be employed.

Referring to Fig. 3, A' designates a stack of impregnated, dried body-sheets; 2 designates a surface-sheet impregnated with urea-formaldehyde resin varnish containing pigment; and $2^a$ designates a film of urea-formaldehyde resin varnish containing ground paper fibres. Sheet 2 serves as a barrier-sheet to cut out the undesirable dark color of the filler sheets. A suitable composition for impregnating the sheet 2 is, for example:

| | Percent |
|---|---|
| Urea-formaldehyde varnish (50% solids) | 80 |
| Titanium oxide white pigment | 20 |

A suitable composition for the varnish which produces the transparent coating $2^a$ is, for example:

| | Percent |
|---|---|
| Urea-formaldehyde varnish (50% solids) | 95 |
| Ground paper fibres | 5 |

In carrying out the process indicated in Fig. 3, the body-sheets are impregnated, cut and stacked; and the sheet 2 is impregnated or coated with the pigmented varnish, dried, and then coated with a film of the clear varnish containing finely ground transparent, or semi-transparent, paper fibres. After the surface-sheet 2 has received the coating $2^a$, the sheet is dried and is then placed upon body-sheets. The assembly is now consolidated under heat and pressure and the resin transformed to the final infusible, substantially insoluble condition. This produces a product very similar to the product produced in accordance with the method illustrated in Fig. 1. The pigment in the varnish applied to the surface-sheet 2 may be any suitable pigment, and a small percentage of a suitable dye may be added to give desired color.

Referring to Fig. 4, $A^2$ designates a foundation-body which may comprise sheets impregnated with a binder; 3 designates a barrier-sheet impregnated with a urea-formaldehyde resin varnish containing pigment; and $3^a$ designates a surface-sheet superposed upon the barrier-sheet and preferably comprising a sheet of transparent, or semi-transparent, paper coated or impregnated with a clear or dyed urea-formaldehyde varnish.

The sheets are impregnated, dried, and cut to desired size; they are then stacked in proper relation; and finally they are pressed in a heated hydraulic press at suitable temperature and pressure to produce a thoroughly consolidated structure of infusible and substantially insoluble character.

The method illustrated in Fig. 4 is somewhat more expensive than the previously described methods, and is less desirable. This is due partially to the fact that it is difficult to obtain a paper which is free from specks or spots. On the other hand, clean paper flock may be obtained which is substantially free from dirt or specks, and this material may be finely ground and, in small percentage, suspended in varnish, which, after being applied, may be consolidated under heat and pressure to give a clear, practically transparent film, which will not " craze ", or produce an infinitude of fine marks (film-ruptures).

Referring to Fig. 5, B designates a surface-sheet adapted to produce a decorative effect. In this case, a clear, translucent sheet of paper is printed with any suitable design, for example, an imitation wood-grain. The sheet is then given a coating of clear varnish containing finely ground paper in small proportion. Such a sheet may be pressed under heat and pressure to transform the resin in the varnish to an infusible, substantially insoluble condition. Such a sheet may be consolidated with a suitable foundation-body. For example, it may be applied, before hot-pressing, to the assembly shown in Fig. 4 in lieu of the sheet $3^a$. In such case, the sheet 3 will serve as a barrier-sheet (to cut off any undesired color from the body-sheets). After consolidation, the printing will appear in relief on the surface-sheet beneath the transparent film of varnish and giving an effect of " depth " which is highly desirable.

In Fig. 5, the portion of the sheet designated 4 displays the printed, but untreated, surface of the sheet; and the portion designated $4^a$ indicates a portion of the sheet after it has had applied to it a varnish containing a small percentage of finely ground paper fibres.

Figure 6:

Referring to Fig. 6, B' designates a surface-sheet. This sheet is first coated or impregnated with a varnish-containing pigment, with or without color, as desired. The sheet is then dried and afterwards coated with a clear varnish containing finely ground paper. The portion of the sheet designated 5 indicates the treatment which the sheet receives when it is coated with varnish containing pigment. The portion designated $5^a$ indicates a portion which has first been treated with varnish containing pigment and afterwards treated with varnish containing finely ground fibre which is of transparent or translucent character, after the hot-pressing operation.

Such a sheet as is indicated in Fig. 6 may be applied to a foundation-body, without the use of a barrier sheet. It may, for example, be substituted for the surface-sheet which is shown in Fig. 1; and after the hot pressing operation, the effect obtained is substantially the same as that obtained by the process indicated in Fig. 1.

It is common to speak of the fine lines which appear in a surface-enamel as "crazing." This highly objectionable phenomenon is prevented, in the process herein described, by incorporating fibre in the film, thereby imparting sufficient toughness to overcome the tendency to " craze " which otherwise would result from variations in temperature, humidity, etc.

The improved product is highly inert, water resistant, and has a film surface of sufficient hardness and body to last indefinitely. The film is of enamel-like character and may be washed or cleansed, as desired.

The surface-sheets may, if desired, be solid-color sheets; or they may be translucent sheets which become transparent, or semi-transparent, after consolidation under heat and pressure.

In mixing the varnishes, variations in proportions are admissible, depending upon the result desired. Where a white pigment which will give thorough opacity is desired, 15–20% of a pigment like titanium oxide white pigment serves the purpose admirably. Where a heavy color is to be introduced, the percentage of pigment may be reduced. The pigment and the finely ground paper fibres have the effect of giving body to the resin-varnish, thereby rendering the pressing between hot plates, as distinguished from closed molds, readily feasible.

The principle of employing finely ground fibres in a synthetic resin varnish, and preferably associated with the use of pigment, is extremely beneficial when used in connection with urea-formaldehyde resin varnishes. Where great toughness is desired in a clear varnish which is much less subject to danger of "crazing", the same expedient may be used with considerable advantage. For example, it may be used in a phenolic condensation product varnish such as bakelite varnish. In certain situations, this is highly desirable, regardless of whether or not a clear varnish is employed. For example, in molding laminated rods, or tubes, of large diameter, considerable difficulty is experienced in avoiding annular cracks. This tendency can be markedly reduced by using a paper which has been impregnated with a varnish containing ground paper fibres. In the molding operation, this mixture of resin and fibres is free to flow and compensates for the rupturing of the laminations produced in the molding operation. Again, in pressing a laminated sheet with an irregular surface, such as a morocco leather texture, considerable difficulty arises in ordinary practice due to shearing off of the raised portions of the surface in the cooling process, at which time the laminated material contracts more than the embossed metal plate with which it is in contact. If fibres are incorporated in the pigment-varnish film of the surface-sheet, the tendency for raised portions to be broken off the base sheet is practically eliminated. So far as my experience goes, this toughening effect cannot be obtained with the customary plasticizers for phenol resins, because the presence of these high-boiling liquids (plasticizers) in surface-sheets causes sticking to the metal plate on which the material is pressed, producing poor surfaces, and increasing water absorption.

It is desirable to use comminuted or pulverized paper of about 200 mesh. However, the fineness of the comminution may vary greatly. Pulverized paper of about 25 mesh as been used satisfactorily, and may even be desirable for certain purposes.

The foregoing detailed description has been given for clearness of understanding only, and no undue limitations should be understood therefrom, but the appended claims should be construed as broadly as permissible, in view of the prior art.

What I regard as new and desire to secure by Letters Patent is:

1. The process which comprises: applying to a foundation-body a surface-sheet impregnated with a potentially reactive synthetic resin varnish containing a small percentage of finely ground paper; and consolidating the assembly under heat and pressure to produce a laminated structure having a continuous, non-"crazing" surface film.

2. The process which comprises: applying to a foundation-body a sheet and a potentially reactive synthetic resin varnish carrying pigment and a small percentage of finely ground fibre; and consolidating the assembly under heat and pressure to produce an infusible, substantially insoluble product having a continuous protecting film thereon.

3. The process of producing a laminated product which comprises: applying to a foundation-body a surface-sheet and a urea-formaldehyde resin varnish having ground fibre incorporated therein; and consolidating the structure under heat and pressure to produce a body having an infusible, substantially insoluble continuous film on its surface.

4. The process of producing a non-"crazing" surface-sheet, which comprises: coating said sheet with a film of urea-formaldehyde resin varnish containing pigment and finely ground fibre; and pressing the treated sheet under heat and pressure to produce an infusible, substantially insoluble product.

5. The process of producing a laminated product which comprises: applying to a surface-sheet an opaque film of a urea-formaldehyde resin varnish containing pigment; thereafter coating said sheet with a urea-formaldehyde resin varnish containing finely ground fibres, assembling a foundation-body and said sheet; and consolidating the assembly under heat and pressure and converting the resin to an infusible, substantially insoluble condition.

6. The process of producing a laminated product which comprises: applying to a foundation-body a surface-sheet coated or impregnated with a film of varnish-composition, comprising about 80% urea-formaldehyde resin varnish, about 15% pigment, and about 5% ground paper fibres; and consolidating the assembly under heat and pressure to produce an infusible, substantially insoluble product.

7. The process of producing laminated rods or tubes, which comprises: impregnating a sheet of fabric with a potentially reactive synthetic resin varnish containing comminuted fibres and drying the sheet; rolling the sheet up into rod or tube form; and molding the assembly under heat and pressure and converting the resin to an infusible state.

8. The process of producing a laminated product having an irregular surface, which comprises: applying to a foundation-body a sheet of fabric having associated therewith a potentially reactive synthetic resin varnish containing comminuted fibres; and consolidating the assembly under heat and pressure in embossed dies and converting the resin to an infusible state.

9. A laminated product having a surface sheet having printed thereon a decorative design, said sheet having over the printed design a coating of a urea-formaldehyde resin varnish containing a small percentage of ground fibre, said laminated product having been consolidated under heat and pressure and said resin converted to an infusible, substantially insoluble condition.

10. The process of producing a laminated product which comprises: impregnating a surface-sheet with a varnish containing pigment and drying the sheet; coating the dried sheet with a clear varnish containing a small percentage of finely ground paper and again drying the sheet; applying the dried sheet to a foundation-body; and consolidating the assembly under heat and pressure to produce an infusible, substantially insoluble product.

JOHN D. COCHRANE, JR.